United States Patent [19]

Grandone

[11] Patent Number: 4,956,148

[45] Date of Patent: Sep. 11, 1990

[54] LOCKING RACK AND DISPOSABLE SAMPLE CARTRIDGE

[75] Inventor: Cass J. Grandone, Lake Forest, Ill.

[73] Assignee: Abbott Laboratories, Abbott Park, Ill.

[21] Appl. No.: 399,365

[22] Filed: Aug. 28, 1989

Related U.S. Application Data

[63] Continuation of Ser. No. 41,189, Apr. 22, 1987, abandoned.

[51] Int. Cl.[5] ...................... G01N 35/00; B65D 83/00

[52] U.S. Cl. ........................................ 422/64; 422/63; 422/101; 422/102; 436/45; 206/561; 206/564; 211/77

[58] Field of Search ............... 206/561, 567, 569, 559; 211/74, 77, 78, 133; 422/63-67, 102, 101; 436/45

[56] References Cited

U.S. PATENT DOCUMENTS

| | | | |
|---|---|---|---|
| D. 287,633 | 1/1987 | Hollar et al. | D24/31 |
| 3,276,314 | 10/1966 | Robinson | 353/111 X |
| 3,425,568 | 2/1969 | Albright | 211/94 X |
| 3,785,773 | 1/1974 | Rohrbaugh | 422/102 |
| 3,857,491 | 12/1974 | Townsend et al. | 211/64 X |
| 4,101,383 | 7/1978 | Wyatt et al. | 195/103.5 R |
| 4,126,418 | 11/1978 | Krasnow | 422/64 |
| 4,189,074 | 2/1980 | Davies | 211/70.5 X |
| 4,322,216 | 3/1982 | Lillig et al. | 23/230 |
| 4,360,360 | 11/1982 | Chiknas | 422/64 X |
| 4,371,498 | 2/1983 | Scordato et al. | 422/102 |
| 4,456,581 | 6/1984 | Edelmann et al. | 422/72 |
| 4,462,964 | 7/1984 | Guigan | 422/102 |
| 4,676,952 | 6/1987 | Edelmann | 422/72 |

*Primary Examiner*—Robert J. Warden
*Assistant Examiner*—Jill Johnston
*Attorney, Agent, or Firm*—Richard D. Schmidt; John W. Cornell; Donald L. Corneglio

[57] ABSTRACT

A plurality of disposable cartridges, each having a plurality of wells including at least one assay reaction well, are loaded in a plurality of openings arranged radially around a rack of a carousel. Securing of the cartridges in a predetermined orientation and position in said openings is ensured by means of alignment and securing means on the cartridges and corresponding means on the rack. A locking hub with tangs is mounted on the rack and is rotated to cause the tangs to contact locator tabs on each cartridge to force locator nubs on each of the cartridges radially into corresponding notches on the rack, and to accurately wedge the cartridges against the outer periphery of the rack. The carousel indexes for positioning the cartridges under a variety of stations, one of which generally contains an optical reader such as a fluorometer.

11 Claims, 2 Drawing Sheets

FIG. 1
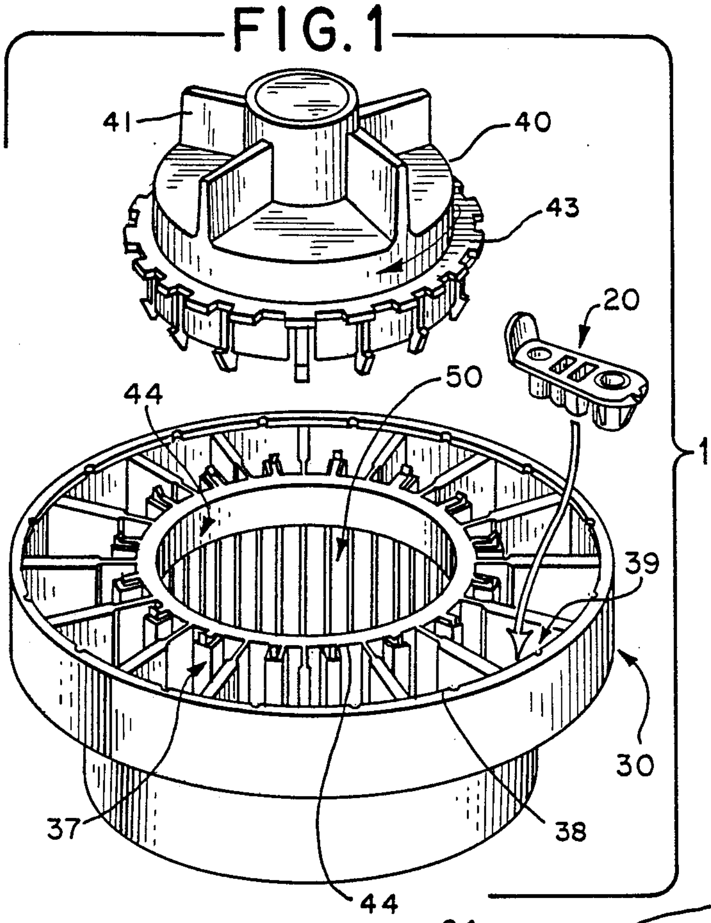
FIG. 4
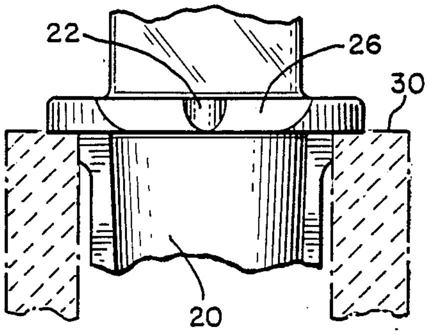
FIG. 5
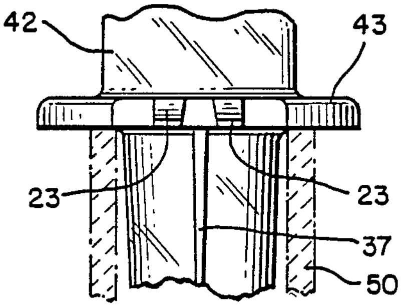
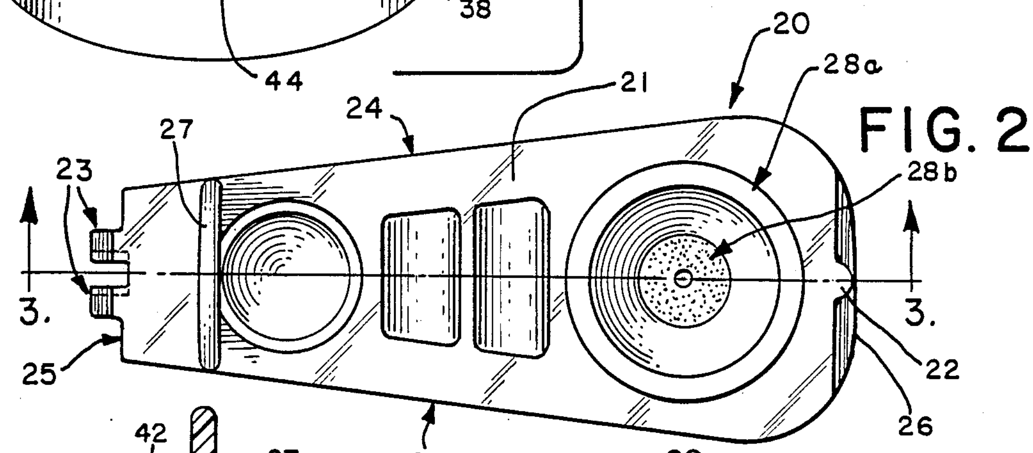
FIG. 2
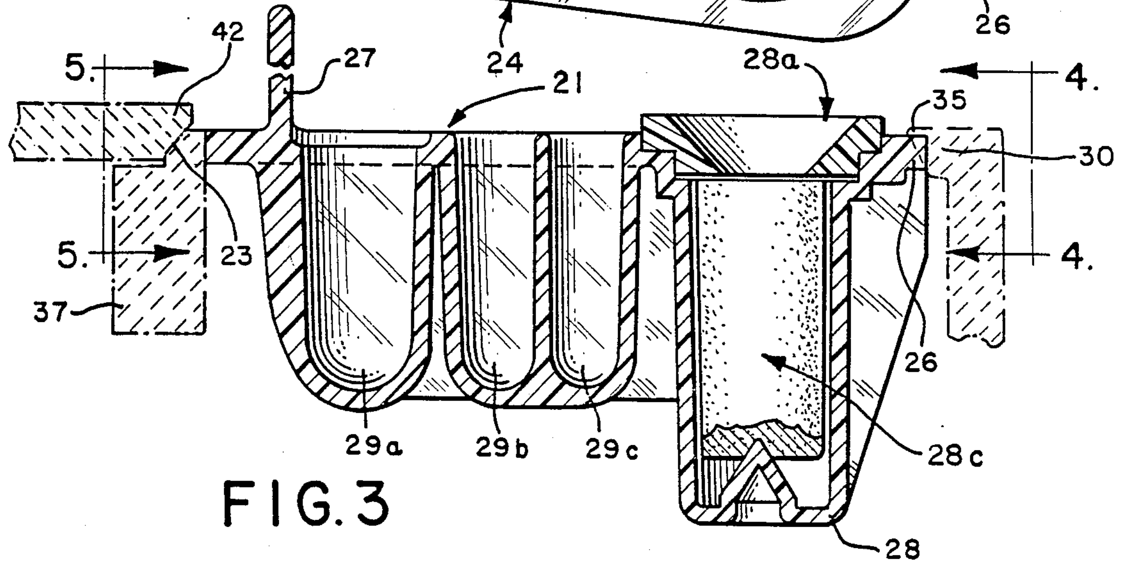
FIG. 3

FIG. 6
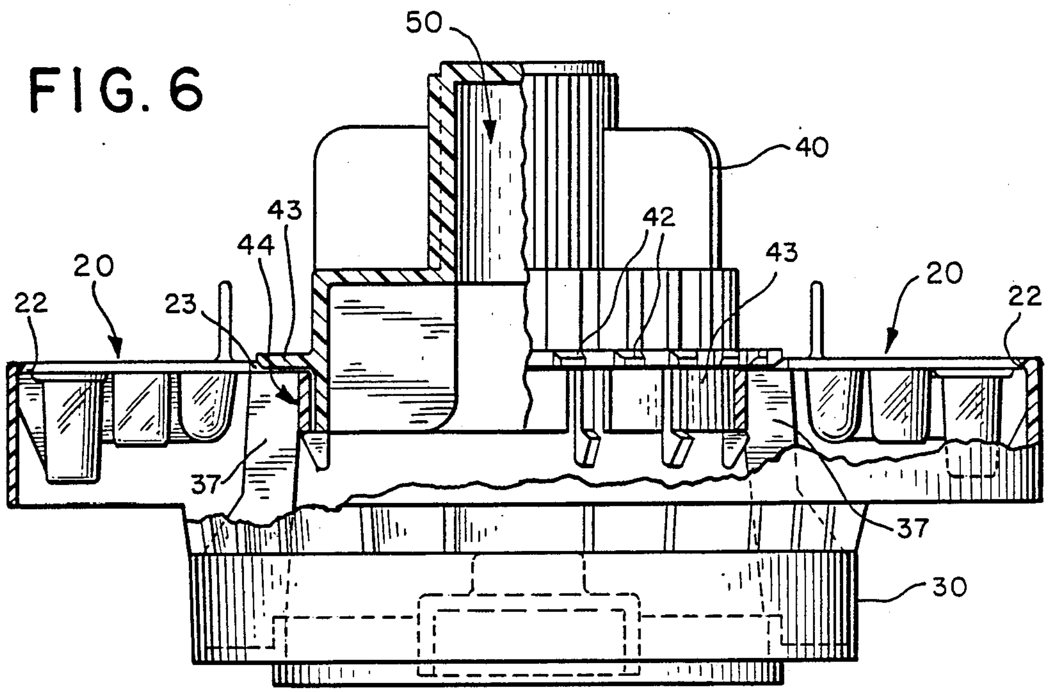
FIG. 7
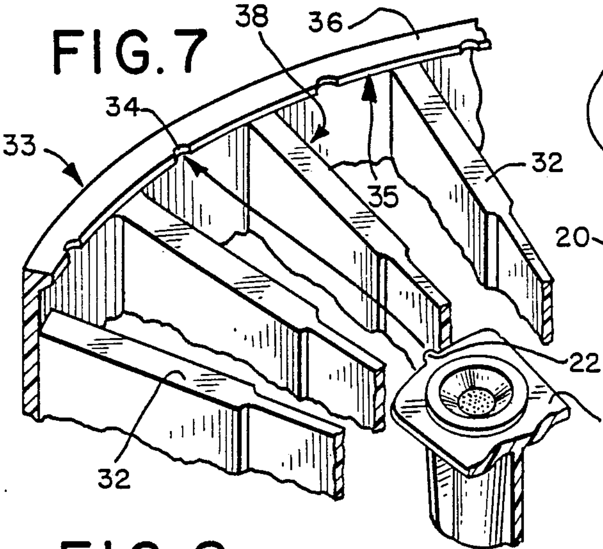
FIG. 9
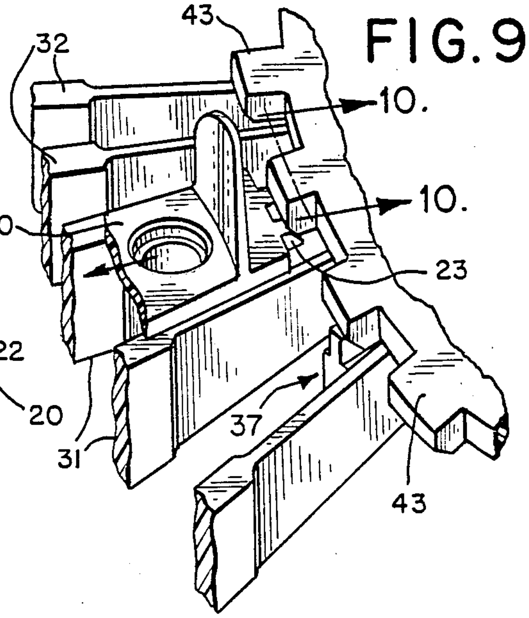
FIG. 8
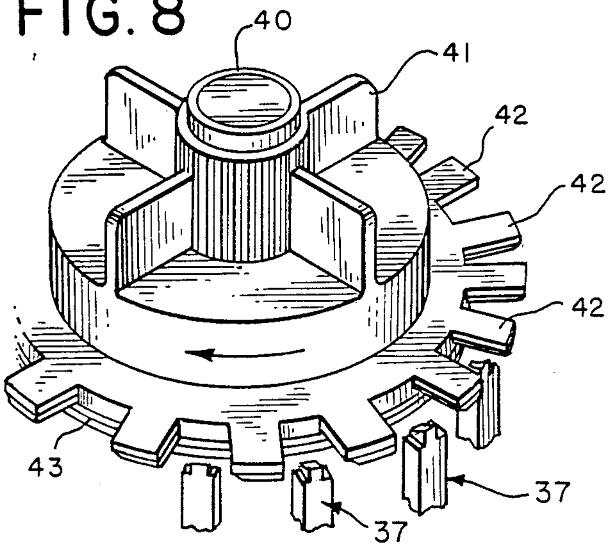
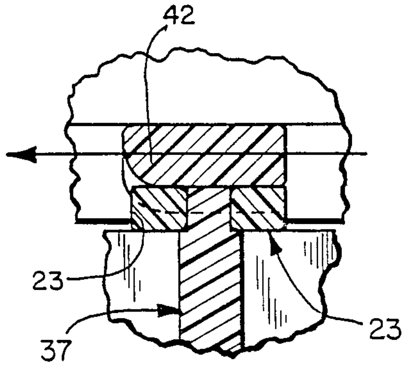
FIG. 10

LOCKING RACK AND DISPOSABLE SAMPLE CARTRIDGE

This application of a continuation of application Ser. No. 07/041,189, filed Apr. 22, 1987, which is now abandoned.

BACKGROUND OF THE INVENTION

The present invention relates to an apparatus for the accurate positioning of assays with respect to reading apparatuses. More specifically, the present invention relates to a carousel on which a plurality of disposable cartridges containing solid-phase assays are expediently positioned with minimal effort to a high degree of accuracy with respect to an optical reading apparatus through a series of locating nubs and tabs.

Solid-phase procedures and apparatuses for performing immunoassays in general and enzyme immunoassays in particular are generally well known in the art. These immunoassays can be performed on biological samples such as blood, spinal fluid, urine, serum, and plasma, to name a few. One particularly cost effective apparatus which has been developed and adapted for use in conjunction with solid-phase procedures to perform a variety of assays (such as sandwich and competitive assays) is a disposable assay cartridge having a plurality of wells, with at least one reaction well. The reaction well generally contains a fibrous matrix positioned across its entrance and an absorbent material positioned below the fibrous matrix. Microparticles, contained in or introduced into the fibrous matrix, react with a sample and an analyte-containing reagent which have been added to the reaction well to form an immobilized complex on the matrix. The excess sample and reagent are washed through the matrix and captured in the absorbent material below.

The resulting assay may be read using known optical detection apparatuses. For example, using conventional solid-phase procedures, the analyte can be labelled or tagged with a fluorophor which, when excited by light of a known wavelength, fluoresces and emits light at a second known wavelength. The intensity of the emitted light is indicative of the concentration of the analyte in the biological sample. A conventional fluorometer is suitable for illuminating the fibrous matrix with a beam of light having the appropriate excitation wavelength. The fluorometer also detects the intensity of the light at the emission wavelength. Assays using this type of solid-phase technology have been found to provide a high degree of sensitivity.

Disposable assay cartridges such as those described above are particularly well suited for use in automated assay preparation and reading equipment. Due to the high degree of sensitivity of assays using the fibrous matrix technology, it is imperative in such automated equipment that the assay-containing reaction well of each and every cartridge be positioned with a high degree of accuracy in each of three dimensions with respect to the optical reading apparatus in order to ensure that the readings have a repeatable high degree of accuracy.

The assays must not only be precisely positioned, they must be effortlessly and transparently positioned by even an unskilled operator with the same high degree of accuracy, in order to reduce the time and cost of each assay. That is, when the assays can be performed and read in a mass production-type manner, the unit cost for such assays decreases. In addition, the assay results can be made available more quickly.

A variety of automated assay equipment is known in the art. Such equipment typically includes apparatuses for moving various types of assay containers between certain assay preparation stations These known apparatuses also position the prepared assays in proximity to various optical equipment for reading. However, known moving apparatuses employed in such equipment are not suitable for use with disposable cartridge type assay containers of the previously described type. In addition, although some such apparatuses have in the past included locking means for retaining individual assay containers, such apparatuses have lacked means to provide the precise assay positioning necessary to obtain highly accurate and repeatable optical readings.

For instance, in some known equipment the assays are placed in individual cuvettes or test tubes in a linear arrangement for movement in conveyor belt fashion past various preparation stations and ultimately to a reading station. Yet, these conveyor belts are difficult to accurately position, both in the path of movement as well as perpendicular to that path. In addition, when arranged in this fashion, the assays are sometimes jostled, thus producing elevational variations which result in inaccurate readings.

Additionally, assays have been arranged in individual cuvettes or test tubes on a rotatable carousel rack. The carousel is circularly indexed to sequentially position the assays at various preparation stations and ultimately at a reading station containing an optical reading apparatus, such as a fluorometer. In this instance, the carousel has three potential positioning inaccuracies. The cuvette may be improperly positioned (1) radially with respect to the center of the carousel, (2) vertically with respect to the optical axis, and (3) laterally with respect to the radial axis in which the cuvette is held in the carousel In addition, all of the previously used apparatuses have failed to provide means for effortlessly and transparently loading, locking, and precisely positioning a plurality of test tubes, cuvettes or other assay containers on the carousel, as well as for releasing such containers after the assays have been read.

SUMMARY OF THE INVENTION

The present invention, therefore, ensures the highly accurate positioning of a plurality of assays for optical reading while simultaneously ensuring the expeditious, effortless, and transparent loading, locking, and precise positioning of the assays. In this way, the automated mass positioning of the assays compliments speed and accuracy of the assay results.

The device of the present invention is a rack apparatus, a preferred form of which is a circular carousel, into which are placed a plurality of disposable assay cartridges. The cartridges are placed in a plurality of openings arranged around a central core of the carousel and specially formed to hold the cartridges. All cartridges have individual alignment features that insure their accurate alignment within the openings of the rack. In a preferred embodiment, these alignment members consist of a locator nub on the outer edge of the cartridge adapted to fit within a locator notch on the outer circumference of the rack. In addition, the inner edge of the cartridge contains two locator tabs. These locator tabs fit under a locking device placed over both the central core of the rack and the inner edge of each cartridge. This locking mechanism enables an operator to effortlessly and transparently lock the cartridges into precise positions within the openings with a single rotational actuation of the mechanism.

A plurality of locking tangs on the locking mechanism are adapted to simultaneously contact and push against corresponding pairs of locator tabs on each disposable cartridge which in turn, push the locator nubs into the locator notches when the locking mechanism is actuated. The outer edge of each cartridge is also beveled and is urged into secure mating contact with a similarly beveled undercut lip on the outer circumference of the rack. The locator notch and undercut lip both serve to prevent the rocking of the cartridges. The locator nubs, notches, tabs, bevels and tangs all prevent motion in any of the directional degrees of freedom. With such accurate positioning, the precise location of each disposable cartridge on the carousel is guaranteed.

The rack containing the cartridges can be circularly indexed to accurately position each assay-containing cartridge relative to a reading station containing an optical reading apparatus. Because the reading positioning is highly accurate, the assay is, with regularity, properly positioned for reading at the reading station.

The device of the present invention also provides effortless, expedient, and safe disposal of the cartridges following the readings of the assays. The operator simply de-actuates the locking mechanism with a single rotational de-actuation and inverts the carousel to release the cartridges.

DESCRIPTION OF THE DRAWINGS

Further aspects and benefits of this device will become apparent through observing the attached drawings and detailed description of this invention in which:

FIG. 1 is an exploded perspective view of the preferred embodiment of the present invention.

FIG. 2 is a plan view of a disposable cartridge suitable for use with the preferred embodiment of the present invention.

FIG. 3 is an elevation view in cross section of the cartridge of FIG. 2, shown placed within the rack of the present invention with its associated locking hub in place, across lines 3—3 of FIG. 2.

FIG. 4 is an elevation view in cross section showing a disposable cartridge of the present invention in an opening of the carousel rack and illustrating the locator nub of the cartridge, taken across lines 4—4 of FIG. 3.

FIG. 5 is an elevation view in cross section showing a disposable cartridge of the present invention in an opening of the carousel rack and illustrating the locator tabs of the cartridge, taken across lines 5—5 of FIG. 3.

FIG. 6 is an elevation view in partial cross-section of a preferred embodiment of the carousel rack of the present invention.

FIG. 7 is a close-up perspective view of the locator nub of a cartridge of the present invention shown in relationship with a corresponding locator notch of the carousel rack of the present invention.

FIG. 8 is a close-up perspective view of the locking hub of the present invention shown in relationship with the carousel rack of the present invention.

FIG. 9 is a close-up perspective view of the locator ramps of a cartridge of the present invention shown in mating relationship with the corresponding locator tangs of the locking hub of the present invention.

FIG. 10 is a cross-sectional view of the locator tabs of a cartridge shown in mating relationship with the corresponding locator tangs of the locking hub of the present invention and the carousel rack of the present invention, as taken across lines 10—10 of FIG. 9.

DETAILED DESCRIPTION OF A PREFERRED EMBODIMENT OF THE PRESENT INVENTION

As seen from FIGS. 1-10, the preferred embodiment of the present invention comprises a carousel 10 having a circular rack 30 for holding a plurality of disposable assay cartridges 20, and a locking hub 40 which cooperates with the rack 30 to hold the cartridges 20 in place on the carousel 10. As seen in FIGS. 2 and 3, each of the cartridges 20 has a top surface 21 and a plurality of wells 28, *29a*, *29b*, and *29c*. Well 28 is an assay reaction well and includes a funnel *28a*, fibrous matrix *28b*, and underlying absorptive material *28c*. The reaction well 28 is provided to contain an assay for reading under an optical reading apparatus, such as a fluorometer (not shown).

Each cartridge 20 has a pair of converging lateral sides 24 which correspond to converging sides of bottomless openings 39 located around the circumference of the rack 30. The cartridges 20 are preferably formed from injection molded ABS and SAN or equivalent plastics. Each of the lateral sides 24 is connected by an outer edge 26 and an inner edge 25 which correspond to outer and inner walls 38 and 44 respectively, of the openings 39 in the rack 30. Each of the cartridges 20 also contains a locator nub 22 centered on its outer edge 26 and a pair of parallel, substantially vertical beveled locator tabs 23 on its inner edge 25. The locator nubs 22 and locator tabs 23 are used to accurately position each cartridge laterally within an opening 39 in the rack 30. Each cartridge also has a finger tab 27 which allows an operator to easily and quickly place the cartridges 20 into the openings 39 of the rack 30. From the foregoing, it should be apparent that the geometries of the openings 39 and cartridges 20 preferable correspond in such a way that the cartridges 20 can be loaded into the openings 39 with only one orientation. This ensures that the cartridges 20 are always properly loaded for reading.

As seen in FIGS. 6, 7 and 9, the rack 30, which rotates about a central core 50 defined by a circular inner wall 44, contains a plurality of radially-projecting dividing walls 31 which, together with circular inner and outer walls 44 and 38, form the openings 39 into which each of the cartridges 20 fit. Each opening 39 isolates an individual cartridge 20 from every other cartridge. One advantage of such isolation is that each cartridge can be uniformly heated to a desired temperature during assay preparation by allowing warmed air to flow from beneath the carousel 10 into each of the openings 39. The rack 30 is preferably formed from an injection molded ABS or equivalent plastic. Each dividing wall 31 has a top reference plane 32 upon which sit the bottoms of the disposable cartridges 20. As seen in FIGS. 8-10, projecting radially from the circular inner wall 44 of each opening 39, there is a substantially vertical rail 37 which is adapted to fit between the beveled tabs 23 of cartridge 20. As seen in FIG. 7, on the outer circumference 33 of the rack there is a beveled undercut lip 35. Each undercut lip 35 has a plurality of locator notches 34, preferably centered in each opening 39. A locator nub 22 on each cartridge 20 is adapted to fit inside a corresponding locator notch 34 on the outer circumference 33 of the rack 30. The wedged outer edge 26 of the cartridge 20 also is adapted to fit against the undercut lip 35 on the outer circumference 33 of the rack 30. Thus, each cartridge 20 is restricted against movements in any plane of motion when mounted in the carousel rack 30.

As seen in FIGS. 1, 6 and 8, the locking hub 40 is comprised of a set of hand locking tabs 41 and an annular snapping cylinder 43 for mounting the locking hub 40 to be rotatable in the circular inner wall 44. As with the rack 30, the locking hub is preferably formed from an injection molded ABS or equivalent plastic. The hand locking tabs 41 allow locking hub 40 to be rotated in the circular inner wall 44 into locking position, as shown in FIG. 8. In addition, the locking hub 40 contains a plurality of hub locking tangs 42 which correspond to the number of openings 39 located around the circumference of the rack 30, as seen in FIGS. 8, 9, and 10. In the preferred embodiment, the hub locking tangs 42 are angularly sloped so that they fit against the beveled locator tabs 23 of the cartridges 20, when the cartridges are seated in each opening 39 and the locking hub 40 is rotated into locking position. When the locking hub 40 is rotated into locking position, the hub locking tangs 42 create a downward and outward radial force on the corresponding locator tabs 23 of the cartridges 20, so that the locator nubs 22 of the cartridges 20 are radially forced securely into the locator notches 34 of the rack 30. Also, a secure press fit is established between the beveled locator tabs 23 of each cartridge 20 and the hub locking tangs 42 of the locking hub 40 and between the wedged outer edge 26 of each cartridge 20 and the undercut lip 35 of the rack 30. Thus, each cartridge 20 is precisely positioned and secured against movement vertically, laterally, or radially within a corresponding opening 39.

As a result of the corresponding geometries of the cartridges 20 and openings 39, in operation, any number of cartridges can be effortlessly placed in each of the corresponding openings 39, aligned with the respective locator notches and vertical rails 34 and 37 of the rack 30. When the locking hub 40 is manually rotated, the cartridge 20 in each opening 39 is individually precisely positioned and locked into place. This is all done with minimal initial positioning by the operator and accommodated with one effortless rotational locking motion. Thus, the function of precisely positioning the cartridges in each of three directions—radially, laterally, and vertically—is accomplished by the simple rotation of the locking hub and is completely transparent to the operator. Also, the cartridges 20 are expediently and safely removed from the rack 30 by simply rotating the locking hub 40 to unlock the cartridges 20, turning over the rack 30, and allowing the cartridges 20 to fall out effortlessly.

In the presently preferred embodiment, any number of disposable cartridge 20 are positioned, within a high degree of planar accuracy, in the rack 30. For instance, the cartridges 20 preferably have a nominal maximum width of approximately 0.824", which narrows linearly to approximately 0.436" over a distance of about 1.885". The maximum lateral movement of the cartridge 20 in the opening 39 is preferably minimized to within approximately ±0.004" by the locator nubs 22 along with the locator tabs 23 on the ends of the disposable cartridges 20 and the corresponding locator notches 34 of the rack 30. The locator nubs 22 preferably have a nominal diameter of approximately 0.080" with a tolerance of approximately ±0.001", and the locator notches 34 which receive the nubs each have a corresponding diameter. In addition, the vertical tolerance, that is, the elevational depth of the cartridges 20, is preferably held within a variation of less than ±0.004" due to the strict dimensional conformance made in the height of the disposable cartridges 20 when seated in the rack 30. The cartridges 20 are tightly held within the outer circumference 33 of the rack 30 by the corresponding locking tangs 42 on the locking mechanism 40 which create downward and radial forces that cause the disposable cartridges 20 to be locked into position against the outer edge of the rack 30. Both the locator tabs 23 and the hub locking tangs 42 on the locking hub preferably have a nominal mating width of approximately 0.060" radially. The circumference of the undercut lip 35 is preferably concentric to within approximately ±0.002" with respect to the inner wall 44. Consequently, the radial tolerance (the motion into and out of the center of the carousel 10) is preferably limited to approximately ±0.002". In this way, the accurate positioning necessary for accurate and repeatable optical reading of the assays in the reaction wells 28 of the cartridges 20 is ensured.

While the invention has been described in connection with the presently preferred embodiment, it should be immediately apparent to those skilled in the art that various changes and modifications to the structure, arrangement, portions, elements, materials, and components used in the practice of the invention which are particularly adapted for specific environments are possible without departing from the principles of this invention. For example, it is understood that the principles of the invention apply not only to circular carousel racks but also to racks having other geometries such as linear racks having corresponding sliding locking mechanisms rather than the rotatable locking mechanism of the preferred embodiment. It is also understood that the specific geometries of the preferred locking and aligning mechanisms provided on the locking hub, the rack and the cartridges can be altered so long as the functional interrelationship of these elements provides the positioning and securing of the cartridges necessary to achieve the objectives of the invention. It is therefore intended that the foregoing description be regarded as illustrative rather than limiting, and it is understood that the following claims, including all equivalents, define the scope of this invention.

I claim:

1. An apparatus for use in a biological sample analyzer comprising a plurality of cartridge means for holding fluids, said apparatus further comprising:

indexing rack means having a plurality of openings each of said plurality of openings receiving a one of said plurality of cartridge means;

alignment means in said each of said plurality of openings aligning said one of said plurality of cartridge means in a predetermined orientation in said each of said plurality of openings;

securing means in said each of said plurality of cartridge means in said each of said plurality of openings and thereby securing said each of said plurality of cartridge means against movement from a predetermined position in said each of said plurality of openings wherein said securing means includes substantially vertical rail means comprising a portion of a surface of said rack means at least partially defining said each of said plurality of openings and engaging at least a portion of the cartridge means in said opening to restrict lateral movement of the cartridge means in said each of said plurality of openings; and actuatable locking means mounted to said rack means and operative upon actuation to simultaneously engage said each of said plurality of cartridge means in said each of said plurality of openings and positioning and locking said each of said plurality of cartridge means in said each of said plurality of openings in said predetermined position in engagement with the securing means in said each of said plurality of openings.

2. An apparatus for use in a biological sample analyzer comprising a plurality of cartridge means for holding fluids, said apparatus further comprising:

indexing rack means having a plurality of openings each of said plurality of openings receiving a one of said plurality of cartridge means;

alignment means in said each of said plurality of openings aligning said one of said plurality of cartridge means in a predetermined orientation in said each of said plurality of openings;

securing means in said each of said plurality of cartridge means in said each of said plurality of openings and thereby securing said each of said plurality of cartridge means against movement from a predetermined position in said each of said plurality of openings wherein said securing means includes angled surface means in said each of said plurality of openings engaging at least a portion of the cartridge means in said opening with downward pressure in response to the actuation of said locking means to restrict vertical and radial movement of the cartridge means in the opening; and actuatable locking means mounted to said rack means and operative upon actuation to simultaneously engage said each of said plurality of cartridge means in said each of said plurality of openings and positioning and locking said each of said plurality of cartridge means in said each of said plurality of openings in said predetermined position in engagement with the securing means in said each of said plurality of openings.

3. An apparatus for use in a biological sample analyzer comprising a plurality of cartridge means for holding fluids, said apparatus further comprising:

indexing rack means having a plurality of openings each of said plurality of openings receiving a one of said plurality of cartridge means;

alignment means in said each of said plurality of openings aligning said one of said plurality of cartridge means in a predetermined orientation in said each of said plurality of openings;

securing means in said each of said plurality of cartridge means in said each of said plurality of openings and thereby securing said each of said plurality of cartridge means against movement from a predetermined position in said each of said plurality of openings;

and actuatable locking means mounted to said rack means and operative upon actuation to simultaneously engage said each of said plurality of cartridge means in said each of said plurality of openings and positioning and locking said each of said plurality of cartridge means in said each of said plurality of openings in said predetermined position in engagement with the securing means in said each of said plurality of openings wherein said locking means includes a plurality of tang means, sand tang means being operative upon actuation of said locking means to engage at least a portion of the cartridge means in said each of said plurality of openings to position and lock the cartridge means in said each of said plurality of openings in a predetermined position in secure mating contact with said alignment means and said securing means.

4. A system for use in a biological sample analyzer, comprising:

a plurality of cartridge means for containing fluids;

rack means having a plurality of openings each receiving one of said plurality of cartridge means; and actuatable locking means mounted to said rack means and operative upon actuation to simultaneously engage the cartridge means in each opening to position and lock the cartridge means in each opening in a predetermined position in the opening;

wherein each said cartridge means has securing means and each said opening contains corresponding securing means engaging each other upon actuation of said locking means to secure said cartridge means against movement from said predetermined position in said opening; and wherein said securing means includes substantially vertical parallel tab means and wherein said corresponding securing means includes substantially vertical rail means formed in a surface of said rack means defining at least a portion of said opening adapted to fit between said tab means to restrict the lateral movement of the cartridge means in said openings.

5. A system for use in a biological sample analyzer, comprising:

a plurality of cartridge means for containing fluids;

rack means having a plurality of openings each receiving one of said plurality of cartridge means; and actuatable locking means mounted to said rack means and operative upon actuation to simultaneously engage the cartridge means in each opening to position and lock the cartridge means in each opening in a predetermined position in the opening;

wherein each said cartridge means has securing means and each said opening contains corresponding securing means engaging each other upon actuation of said locking means to secure said cartridge means against movement from said predetermined position in said opening; and wherein said corresponding securing means comprises angled surface means formed in a surface of said rack defining at least a portion of said opening and wherein said securing means of said cartridge means comprises corresponding complimentary angled surface means and a plurality of tab means, said tab means adapted to be contacted by said locking means when said locking means is actuated to urge said cartridge means into said predetermined position with said complimentary angled surface means of said cartridge means in secure mating contact with said angled surface means of said rack to restrict radial and vertical movement of said cartridge means in said opening from said predetermined position.

6. A system for use in a biological sample analyzer, comprising:

a plurality of cartridge means for containing fluids;

rack means having a plurality of openings each receiving a said cartridge means; and actuatable locking means mounted to said rack means and operative upon actuation to simultaneously engage the cartridge means in each opening to position and lock the cartridge means in each opening in a predetermined position in the opening; and wherein said locking means includes a plurality of tang means, said tang means being operative upon actuation of said locking means to engage at least a portion of the cartridge means in each of said opening to position and lock the cartridge means in each said opening in said predetermined position.

7. A system for use in a biological sample analyzer, comprising:

a plurality of cartridge means for containing fluids, each of said cartridge means having an inner edge and an outer edge connected by a pair of converging lateral sides;

a circular rack having a circular inner wall which defines a central core, a concentric outer wall, and a plurality of angularly spaced radially projecting dividing walls connected between said inner and outer walls which define a plurality of laterally converging openings each for receiving a said cartridge means with said inner wall adjacent to said inner edge of said cartridge means and said outer wall adjacent to said outer edge of said cartridge means;

each said cartridge means containing a locator nub on said outer edge and a plurality of locator tabs on said inner edge;

each said opening containing a locator notch formed in said outer wall in alignment with said locator nub, and a locator rail formed in said inner wall in alignment between said locator tabs; and rotatable locking means mounted on said central core, said locking means having a plurality of tang means operative to simultaneously contact the locator tabs of the cartridge means in each said opening when said locking means is rotated to urge the locator nub and locator tabs of said cartridge means in each said opening into engagement with said locator notch and said locator rail respectively of said opening to lock said cartridge means in a predetermined position in said opening.

8. The system of claim 7 wherein said outer edge of each cartridge means includes an angled surface, said outer wall of said rack includes a complementary angled surface, and said angled surface is urged into secure mating contact with said complementary angled surface when said locking means is rotated.

9. An apparatus for use in a biological sample analyzer, said apparatus including a plurality of cartridge means for containing fluids, each cartridge means having a plurality of locating tabs, a receiving space formed between said locating tabs, a locator nub, and an angled outer edge, the apparatus further comprising:

a substantially circular rack having an inner circular wall, an outer circular wall, and a plurality of angularly spaced radially-projecting dividing walls connecting said inner circular wall and said outer circular wall to define a plurality of openings, each of said openings receiving one of the cartridge means;

each said opening having means supporting said one of the cartridge means therein;

each said opening having a receiving rail formed in said inner wall, said receiving rail mating with the receiving space of said one of the cartridge means in said opening;

each said opening having a receiving notch formed in said outer wall, said receiving notch receiving the locating nub of said one of the cartridge means in said opening;

each said opening further having an angled surface formed in said outer wall, said angled surface mating with the angled outer edge of said one of the cartridge means in said opening; and a rotatable locking means on said rack, said locking means containing a plurality of locking tangs corresponding in number to said plurality of openings and being operative to simultaneously contact the tabs of said one of the cartridge means in each said opening when said locking means is rotated to urge the nubs on said one of the cartridge means into said notch in said opening and the angled outer edge of said one of the cartridge means into secure mating contact with said angled surface in said outer wall.

10. A disposable cartridge for use in a biological sample analyzer including a rack having a plurality of openings for receiving a plurality of cartridges, each of the openings having substantially vertical rail means, notch means, and angled surface means formed therein, and actuatable locking means mounted to the rack for locking the plurality of cartridges in the plurality of openings when said locking means is actuated, said disposable cartridge comprising:

a top surface having a first edge and a second edge connected by laterally converging sides;

a plurality of wells formed in said top surface for containing fluids;

a plurality of locator tabs formed on said first edge, said locator tabs being adapted to be located adjacent to the locking means when said cartridge is mounted in one of the openings;

a substantially vertical receiving space formed between said locator tabs, said receiving space being adapted to be in alignment with the vertical rail means of an opening when the cartridge is mounted in the opening;

locator nub means formed on said second edge, said locator nub means being adapted to be in alignment with the notch means of an opening when said cartridge is mounted in the opening; and angled surface means formed on said second edge, said angled surface means being adapted to be located adjacent to the angled surface means of an opening when said cartridge is mounted in the opening;

said locator tabs further being adapted to be contacted by a portion of said locking means when said locking means is actuated to urge said locator nub means and said receiving space of said cartridge into engagement with the notch means and rail means, respectively, of the opening and to urge the angled surface means of said cartridge into secure mating contact with the angled surface means of the opening thereby to secure the cartridge in a predetermined radial, vertical, and lateral position in the opening.

11. The disposable cartridge defined in claim 10 wherein at least one of said wells contains a fibrous matrix adapted to contain a solid-phase assay.

* * * * *

UNITED STATES PATENT AND TRADEMARK OFFICE

CERTIFICATE OF CORRECTION

PATENT NO. : 4,956,148

DATED : September 11, 1990

INVENTOR(S) : C. Grandone

It is certified that error appears in the above-identified patent and that said Letters Patent is hereby corrected as shown below:

Column 2, line 38, after "carousel" insert --.--.
Column 4, line 16, delete "absorptive" and insert --absorbtive--.
Column 4, lines 21 and 22, after "sides of" delete --bottomless--.
Column 4, line 47, after "form the" insert --bottomless--.
Column 5, line 38, delete "locator notches" and insert --locking mechanisms--.

Signed and Sealed this

Twelfth Day of May, 1992

*Attest:*

DOUGLAS B. COMER

*Attesting Officer*

*Acting Commissioner of Patents and Trademarks*